United States Patent [19]

Yamamura

[11] Patent Number: 5,151,944
[45] Date of Patent: Sep. 29, 1992

[54] HEADREST AND MOBILE BODY EQUIPPED WITH SAME

[75] Inventor: Souhei Yamamura, Takarazuka, Japan

[73] Assignee: Matsushita Electric Industrial Co., Ltd., Osaka, Japan

[21] Appl. No.: 460,334

[22] PCT Filed: Sep. 21, 1989

[86] PCT No.: PCT/JP89/00958
§ 371 Date: May 15, 1990
§ 102(e) Date: May 15, 1990

[87] PCT Pub. No.: WO90/03136
PCT Pub. Date: Apr. 5, 1990

[30] Foreign Application Priority Data
Sep. 21, 1988 [JP] Japan .................. 63-236916

[51] Int. Cl.⁵ ........................... H04R 3/00
[52] U.S. Cl. ...................... 381/151; 381/114; 381/86
[58] Field of Search ................ 381/151, 114, 86

[56] References Cited

U.S. PATENT DOCUMENTS
4,903,703  2/1990  Igarashi et al. .................... 381/151

FOREIGN PATENT DOCUMENTS
57-56624  12/1982  Japan .
58-78250   5/1983  Japan .
60-67229   4/1985  Japan .

Primary Examiner—Forester W. Isen
Attorney, Agent, or Firm—Stevens, Davis, Miller & Mosher

[57] ABSTRACT

The present invention provides a headrest (1C, 2C) in which a bone-conduction microphone (1B, 2B) is mounted in such a position as to be in contact with the back side of the head of the operator. The invention also provides a mobile body comprising the headrest (1C, 2C) as a constituent member and characterized in that the output of the bone-conduction microphone is used for a telephone voice or for speech recognition control of a device such as one installed on a vehicle. The invention further provides a mobile body comprising the headrest as a constituent member and characterized in that sleep of the operator is detected by the output of the bone-conduction microphone (1B, 2B).

9 Claims, 3 Drawing Sheets

HEADREST AND MOBILE BODY EQUIPPED WITH SAME

TECHNICAL FIELD

This invention relates to a device for obtaining information of the operator from a headrest and a mobile body, such as an automobile, equipped with such a headrest, using a bone-conduction microphone.

BACKGROUND ART

Conventionally, in communicating while the driving a motor bicycle when both hands are fully occupied, or in a communication at a construction site where the hands can not be used, a headband 3C holding a bone-conduction microphone 3B is tied around the head 3A, as shown in FIG. 5. Also, as shown in FIG. 6, a helmet 4C holding a bone-conduction microphone 4B is fitted on the head 4A.

However, in both of the above techniques, the headband or the helmet must be worn on the head. This can become uncomfortable, and has created problems with respect to the appearance and the transmission of signals. Based on the above techniques, the present invention provides means which does not need to be worn on the person each time he gets on a vehicle or the like and is capable of providing communication from the operator without creating discomfort.

DISCLOSURE OF THE INVENTION

In the present invention, a bone-conduction microphone is embedded in a front surface of an operator's headrest in a mobile body, such as an automobile, in such a manner that a vibration surface of the bone-conduction microphone can be pressed accurately against the back of the skull of the operator, thereby capturing speech information via vibrations of the skull generated by the operator. There is also provided a mobile body in which speech information is obtained from the output of the above bone-conduction microphone, and the mobile body has a sleep prevention function.

With the above structure, hand-free telephoning or speech recognition dialing in a mobile body such as an automobile, information relating to human speech can be captured via the bone-conduction microphone from the back of the human skull in a natural driving posture, without being disturbed by howling and external noises.

BEST MODE FOR CARRYING OUT THE INVENTION

Figure 1:
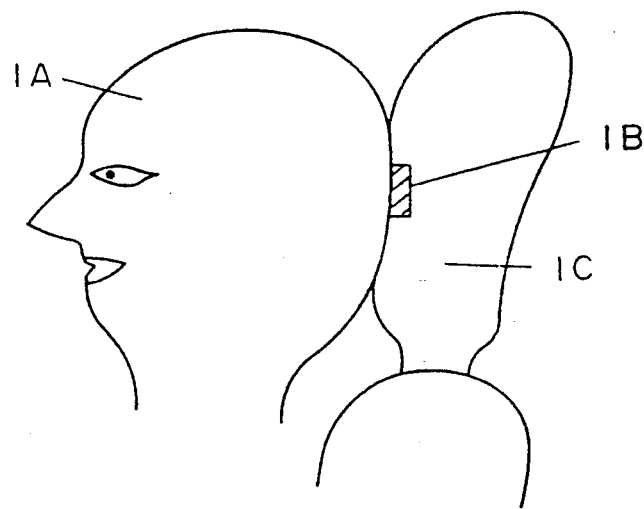
FIG. 1 is a structural view of a headrest according to one embodiment of the present invention.

FIG. 1 is a structural view of a headrest according to one embodiment of the present invention. In FIG. 1, speech information of the operator can be positively caught by embedding a bone-conduction microphone 1B in the surface of a headrest 1C of a mobile body which is positioned to be pressed against the back side of the head 1A. The headrest 1C is usually made of a urethane resin or a cloth, and has sound-insulating effects, and therefore even in a hands-free telephoning, there is no problem of howling. Also, in the case where this construction is applied to a speech recognition dialing, there is not at all encountered any disturbance by external noises.

Figure 2:
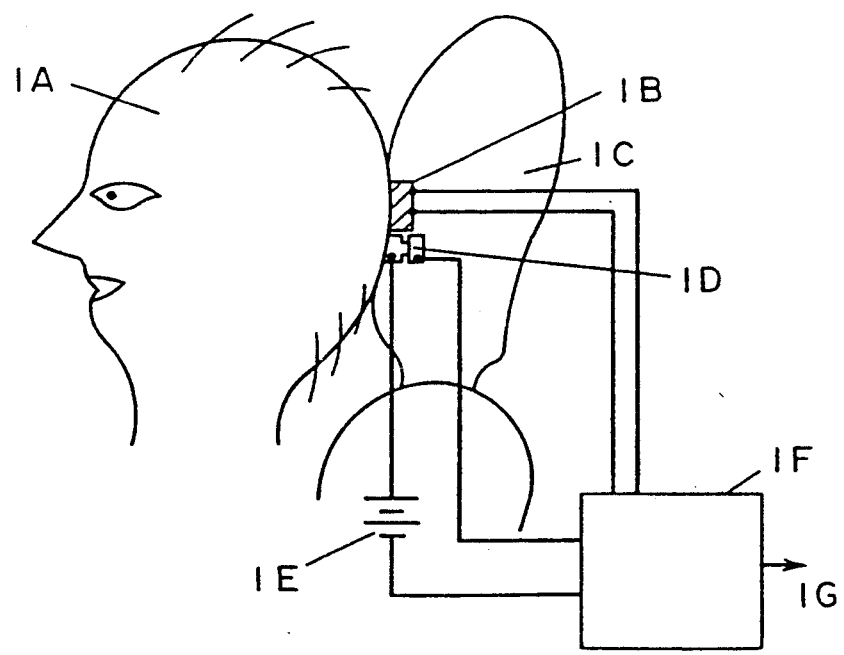
FIG. 2 is a structural view in which a power switch for preventing noises due to the hair is added.

In another embodiment shown in FIG. 2, in order to prevent the generation of noises upon contact of the hair on the back side of the head 1A with the surface of the bone-conduction microphone 1B immediately before the back side of the head 1A is pressed against the bone-conduction microphone 1B, one or more power switches 1D capable of turning on and off a power source 1E of an amplifier 1F, is/are mounted on the headrest 1C in the surroundings of the bone-conduction microphone 1B embedded in the headrest 1C of the mobile body. The power switch 1D is fixedly mounted at such contact position that the power switch can be turned on simultaneously when or after the bone portion at the back side of the head 1A is positively pressed against the bone-conduction microphone 1B. With this construction, the speech recognition rate can be further improved.

Figure 3:
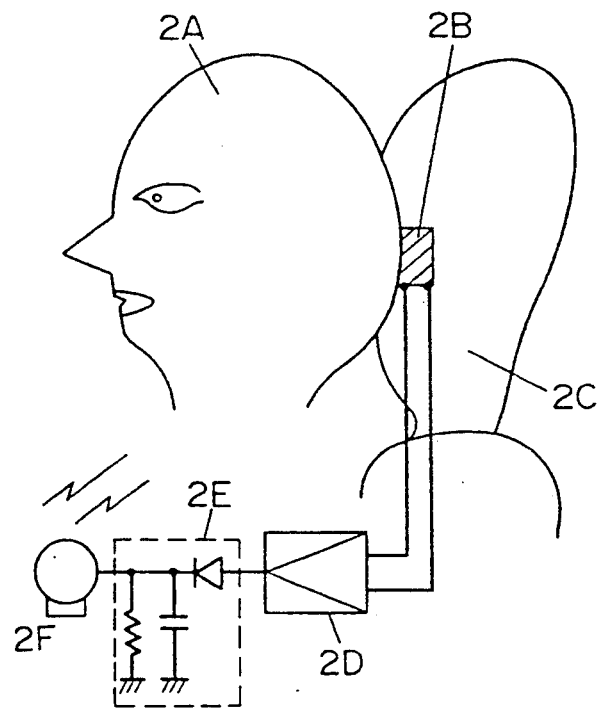
FIG. 3 is a structural view of a sleep prevention device using the headrest.
Figure 4:
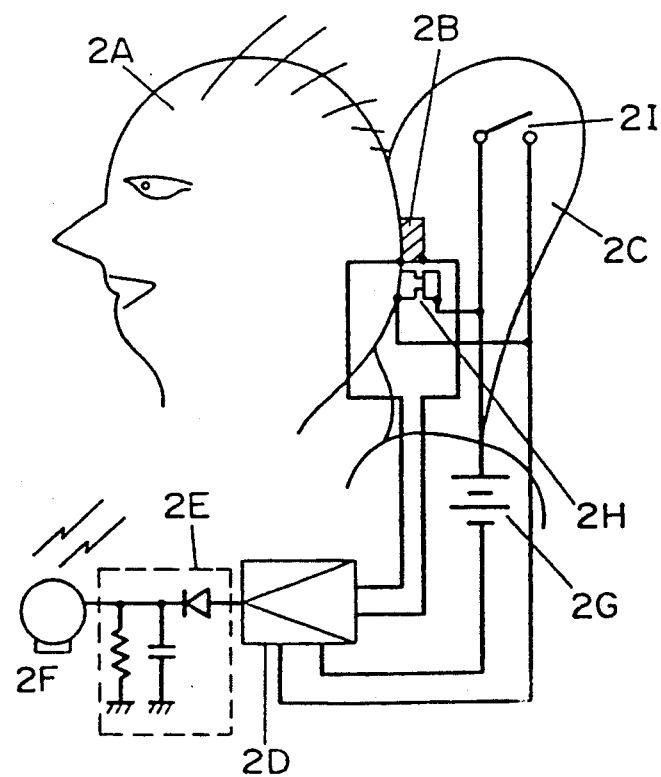
FIG. 4 is a structural view in which a power switch for preventing noises due to the hair and a sleep prevention device starting switch are added.
Figure 5:
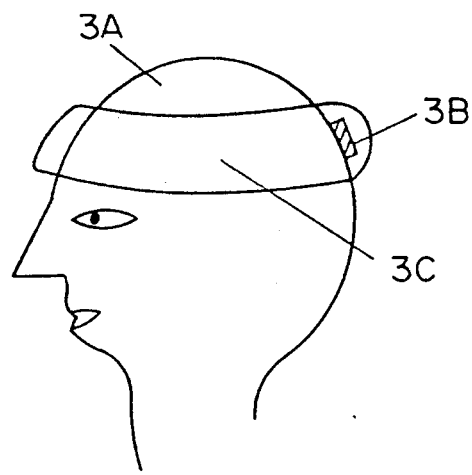
FIGS. 5 and 6 are structural views of conventional devices using different examples of bone-conduction microphones, respectively.
Figure 6:
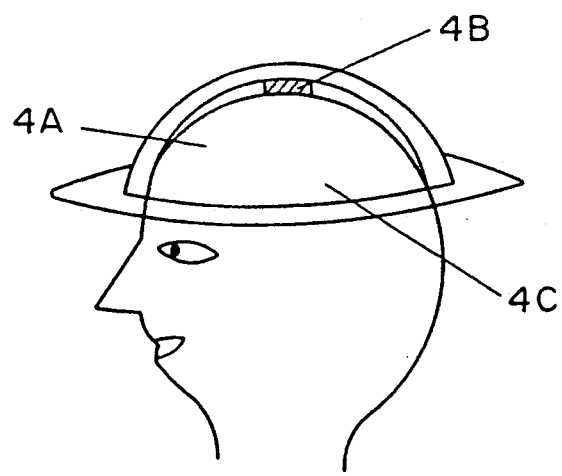

FIGS. 3 and 4 are structural views of sleep prevention devices according to different embodiments of the present invention, respectively. A bone-conduction microphone 2B is mounted on that portion of a mobile body's headrest 2C adapted to be contacted with the back side of the head 2A. The output of the bone-conduction microphone is fed to a buzzer 2F via an amplifier 2D and a detection circuit 2E employing a resistor and a capacitor in parallel to provide a predetermined time delay (due to the time constant of the capacitor) before buzzer 2F will sound. Therefore, sleep can be prevented by a buzzer sound generated when no signal is fed from the operator. The output of the bone-conduction microphone at this time is, for example, a talking voice of the operator, a singing voice of the operator, the degree of pressing of the back side of the head against the bone-conduction microphone, or the like. It can be judged by the output of such information whether or not a sleep condition exists. In the embodiment of FIG. 4, a power switch 2H for preventing bone-conduction microphone noises due to the hair as in the power switch 1D of FIG. 2 is added to the construction shown in FIG. 3. In order to avoid such phenomenon that, simultaneously when the back side of the head 2A unconsciously moves off the bone-conduction microphone 2B as a result of starting the sleep, the power switch 2H is turned off so that the buzzer 2F may cease to generate a buzzer sound, a sleep prevention device starting switch 2I is connected in parallel to the power switch 2H. The construction is such that, so long as the sleep prevention starting switch 2I is in the ON state, the sleep prevention device is always kept in an operative condition.

CAPABILITY OF EXPLOITATION IN INDUSTRY

As described above, in the present invention, information can be obtained from the user (operator) via the headrest in a mobile body, such as an automobile, or at a construction site, in a hands-free situation without operator discomfort. With this arrangement, speech recognition dialing, telephone communication, and sleep prevention functions can be added.

What is claimed is:

1. A headrest comprising a bone-condition microphone mounted thereon in a position so as to be in contact with a back side of the head of the operator during use and a power switch mounted on said headrest adjacent said bone-conduction microphone, said switch having a contact which is turned on substantially simultaneously with positive pressing of the bone-conduction microphone, such that said switch detects contact between the back side of the head of the operator and said bone-conduction microphone.

2. An operator headrest comprising a bone-conduction microphone and a power switch, said bone-conduction microphone being adapted to be in substantial contact with a back side of an operator's head when said headrest is in use, said power switch being activated by said substantial contact of the back side of the operator's head to activate said bone-conduction microphone.

3. An operator headrest as set forth in claim 2, wherein said power switch is pressure activated.

4. An operator headrest as set forth in claim 2, wherein said bone-conduction microphone provides signals for use in a mobile telephone system.

5. An operator headrest as set forth in claim 2, wherein said bone-conduction microphone provides signals for use in speech recognition control of an installed device.

6. An operator headrest as set forth in claim 2, wherein said operator headrest further comprises operator sound recognition means for detecting absence of an operator generated sound.

7. An operator headrest as set forth in claim 6, wherein said operator sound recognition means is connected to said bone-conduction microphone and comprises a buzzer activated by an absence of a signal supplied thereto and a signal detection circuit connected to said buzzer, said signal detection circuit comprising means for activating said buzzer after a predetermined time delay when no operator generated sound from said bone-conduction microphone is detected by said signal detection circuit.

8. An operator headrest as in claim 2 further comprising a sound detection circuit, an amplifier, a time delay circuit and a buzzer, said bone-conduction microphone being connected to said sound detection circuit and said amplifier, an output of said amplifier being connected to said time delay circuit, said time delay circuit being connected to said buzzer, said buzzer being activated after a predetermined time delay when said sound detection circuit detects an absence of sound signals from said bone-conduction microphone.

9. An operator headrest as set forth in claim 7, further comprising a sleep prevention starting switch connected in parallel with said headrest power switch, said sleep prevention starting switch being activatable when said headrest power switch is activated, said sleep prevention starting switch, when activated, maintaining power to said operator sound recognition means even when said headrest power switch is deactivated.

* * * * *